(12) United States Patent
Ogata et al.

(10) Patent No.: US 7,900,244 B2
(45) Date of Patent: Mar. 1, 2011

(54) LOGIN SYSTEM AND LOGIN METHOD

(75) Inventors: Hideaki Ogata, Nagano-ken (JP);
Riichiro Kawahara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1026 days.

(21) Appl. No.: 11/376,340

(22) Filed: Mar. 16, 2006

(65) Prior Publication Data
US 2006/0253898 A1    Nov. 9, 2006

(30) Foreign Application Priority Data

Mar. 16, 2005    (JP) .............................. 2005-075116

(51) Int. Cl.
*G06F 7/04* (2006.01)
*H04L 9/00* (2006.01)

(52) U.S. Cl. .......................................... 726/8; 713/156
(58) Field of Classification Search ................ 713/156, 713/182, 183–186; 726/2, 3–6, 8
See application file for complete search history.

(56) References Cited

U.S. PATENT DOCUMENTS

| | | | |
|---|---|---|---|
| 6,182,142 B1 * | 1/2001 | Win et al. | 709/229 |
| 6,453,353 B1 * | 9/2002 | Win et al. | 709/229 |
| 6,915,289 B1 * | 7/2005 | Malloy et al. | 1/1 |
| 7,099,957 B2 * | 8/2006 | Cheline et al. | 709/245 |
| 7,278,103 B1 * | 10/2007 | Clark et al. | 715/736 |
| 7,293,099 B1 * | 11/2007 | Kalajan | 709/230 |
| 7,296,055 B2 * | 11/2007 | Nomura et al. | 709/204 |
| 7,346,692 B2 * | 3/2008 | Watanabe et al. | 709/228 |
| 7,536,714 B2 * | 5/2009 | Yuan | 726/7 |
| 2003/0079026 A1 * | 4/2003 | Watanabe et al. | 709/228 |
| 2004/0039723 A1 * | 2/2004 | Lee et al. | 707/1 |
| 2005/0144297 A1 * | 6/2005 | Dahlstrom et al. | 709/229 |
| 2007/0276671 A1 * | 11/2007 | Gudigara et al. | 704/270.1 |
| 2008/0139116 A1 * | 6/2008 | Balgard et al. | 455/41.2 |

FOREIGN PATENT DOCUMENTS

| | | |
|---|---|---|
| JP | 2000-267958 A | 9/2000 |
| JP | 2002-183094 A | 6/2002 |

OTHER PUBLICATIONS

Timo Siraninen, GNU FDL 1.1 license, Copyright (c) 2000-2002.*

* cited by examiner

*Primary Examiner*—Ponnoreay Pich
*Assistant Examiner*—Sayed Beheshti Shirazi
(74) *Attorney, Agent, or Firm*—Sughrue Mion, PLLC

(57) ABSTRACT

A login system is adapted to be connected to a network for logging in a plurality of servers connected to the network. A reception processor is operable to receive a designation of at least two of the servers and a password from a user. A login processor is operable to automatically execute a login processing with respect to at least one of the designated servers for which the received password is valid.

7 Claims, 5 Drawing Sheets

FIG. 4

LOGGING IN NETWORK INTERFACES
PLEASE SELECT NETWORK INTERFACES TO BE
LOGGED IN, AND INPUT AN ADMINISTRATOR PASSWORD.
GREEN LAMP IS TURNED ON NEXT TO A SERVER WHICH
HAS BEEN ALREADY LOGGED IN.
THIS SCREEN IS KEPT DISPLAYING UNLESS ALL
THE DISPLAYED NETWORK INTERFACES ARE LOGGED IN.

| SERVER NAME | MAC ADDRESS | IP ADDRESS |
|---|---|---|
| SERVER 12 | | |
| SERVER 14 | | |
| SERVER 16 | | |
| SERVER 18 | | |
| ... | ... | ... |

SELECT ALL

PASSWORD :
* * * * * * * * *

FINISH    OK    CANCEL

FIG. 5

```
LOGGING IN NETWORK INTERFACES
PLEASE SELECT NETWORK INTERFACES TO BE
LOGGED IN, AND INPUT AN ADMINISTRATOR PASSWORD.
GREEN LAMP IS TURNED ON NEXT TO A SERVER WHICH
HAS BEEN ALREADY LOGGED IN.
THIS SCREEN IS KEPT DISPLAYING UNLESS ALL
THE DISPLAYED NETWORK INTERFACES ARE LOGGED IN.
```

| SERVER NAME | MAC ADDRESS | IP ADDRESS |
|---|---|---|
| ○ SERVER 12 | *************** | *************** |
| SERVER 14 | *************** | *************** |
| ○ SERVER 16 | *************** | *************** |
| SERVER 18 | *************** | *************** |
| ... | ... | ... |

[SELECT ALL]

PASSWORD :

[FINISH]   [OK]   [CANCEL]

LOGIN SYSTEM AND LOGIN METHOD

BACKGROUND OF THE INVENTION

The present invention relates to a login system and a login method. Specifically, the present invention relates to a system and a method for logging in at least one of a plurality of servers connected to a network.

For example, Japanese Patent Publication No. 2002-183094A discloses as a login system in which an encrypted password is used so that login a plurality of servers is achieved. In this system, when a client computer logs in a specific server by inputting a user ID and a password, the server encrypts the user ID and the password used for the login, and then transmits them to the client computer. When the client computer should login another server, the client computer transmits the encrypted user ID and password having been received, to the server to be logged in. Thus, the other server decrypts the encrypted user ID and password, and thereby executes login processing.

Nevertheless, in the above-mentioned login system, the client computer needs to login a specific server initially, while another server needs to have relevance to the specific server. Further, the specific server needs to perform encryption processing for the user ID and password, while the other server needs to perform decryption processing for the encrypted user ID and password.

SUMMARY OF THE INVENTION

It is therefore an object of the invention to provide a login system and a login method capable of realizing easy login with respect to a plurality of servers connected to a network, without using encryption processing and decryption processing.

In order to achieve the above object, according to the invention, there is provided a login system, adapted to be connected to a network for logging in a plurality of servers connected to the network, the login system comprising:

a reception processor, operable to receive a designation of at least two of the servers and a password from a user; and a login processor, operable to automatically execute a login processing with respect to at least one of the designated servers for which the received password is valid.

With this configuration, the login with respect to the designated servers can be easily achieved. Further, a plurality of the servers need not have specific relevance to each other.

The login system may further comprise a display operable to display a text and an image. Here, the reception processor is operable to cause the display to display a list of the servers from which the at least two servers are designated, and a text box to which the password is inputted.

With this configuration, the server designation and the password input can be facilitated.

The login processor may cause the display to display an indicator next to the at least one of the designated servers, thereby indicating that the login processing is successfully executed with respect to the at least one of the designated servers.

With this configuration, the user is notified of servers to which login has been successful and servers to which login has been unsuccessful among the designated servers.

The login processor may be operable to activate the reception processor to receive another password with respect to at least one of the designated servers that the login processing is not successfully executed.

With this configuration, login can be performed with respect to remaining one by inputting a different password by selecting servers to be logged into using the different password.

The login processor may be operable to repeat the activation of the reception processor until a termination requirement is satisfied.

Here, the termination requirement may be that login all of a plurality of the servers has been successful or alternatively that the operator performs a termination operation.

Alternatively, the termination requirement may be that an instruction for terminating the login processing is issued from the user.

According to the invention, there is also provided a method of logging in a plurality of servers connected to a network, comprising:

receiving a designation of at least two of the servers and a password from a user; and executing automatically a login processing with respect to at least one of the designated servers for which the received password is valid.

According to the invention, there is also provided a program product comprising a computer program operable to cause a computer to execute the above method.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 3 to 5 are views showing examples of a login screen displayed in the client computer.

DETAILED DESCRIPTION OF THE EMBODIMENTS

Embodiments of the invention will be described below in detail with reference to the accompanying drawings.

Figure 1:
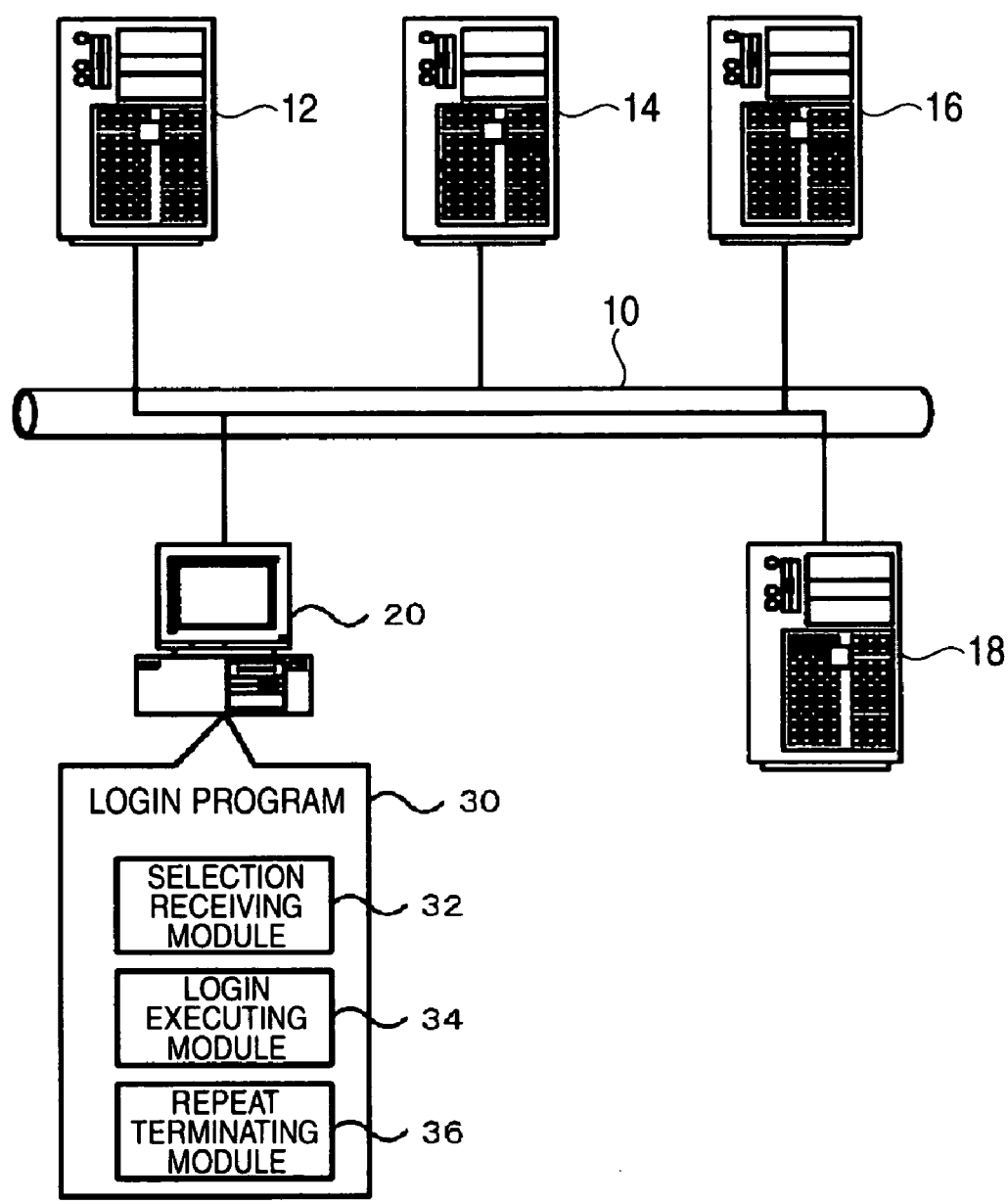
FIG. 1 is a diagram showing a client computer installed with a login program according to one embodiment of the invention and servers which are connected to a network.

As shown in FIG. 1, a client computer 20 in which a login program 30 is installed is connected to a network 10. The login program 30 installed in the client computer 20 includes: a selection receiving module 32 for displaying a login screen and then receiving the selection of servers to be logged in among a plurality of servers 12-18 connected to the network 10 and the input of a login password; a login executing module 34 for sequentially executing login processing to the selected servers using the inputted password; and a repeat terminating module 36 for causing the selection receiving module 32 and the login executing module 34 to repeatedly execute until a termination requirement is satisfied that a termination operation is performed by an operator or alternatively that login all the servers 12-18 connected to the network 10 has been achieved.

Figure 2:
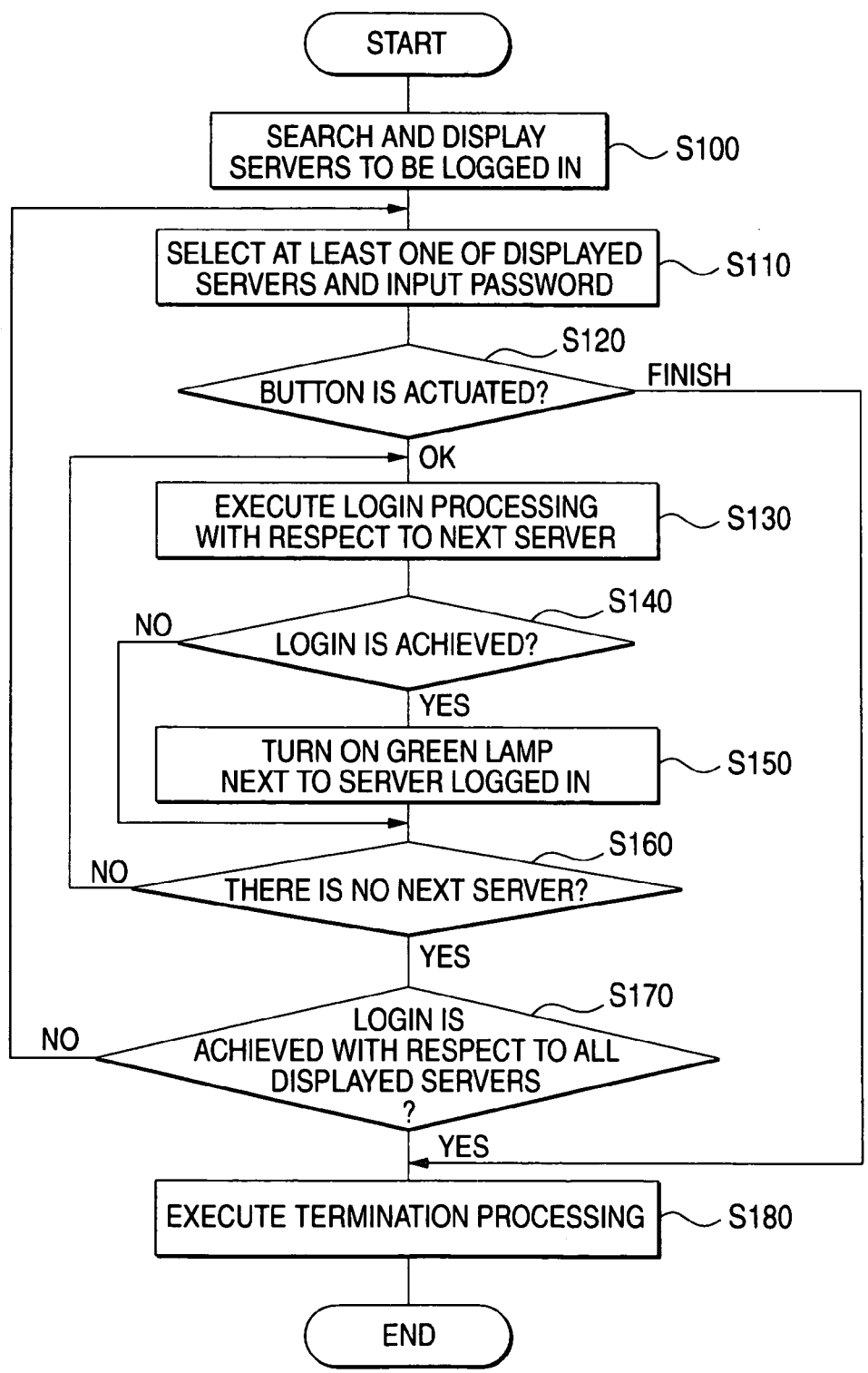
FIG. 2 is a flowchart showing a login processing executed by the login program.
Figure 3:
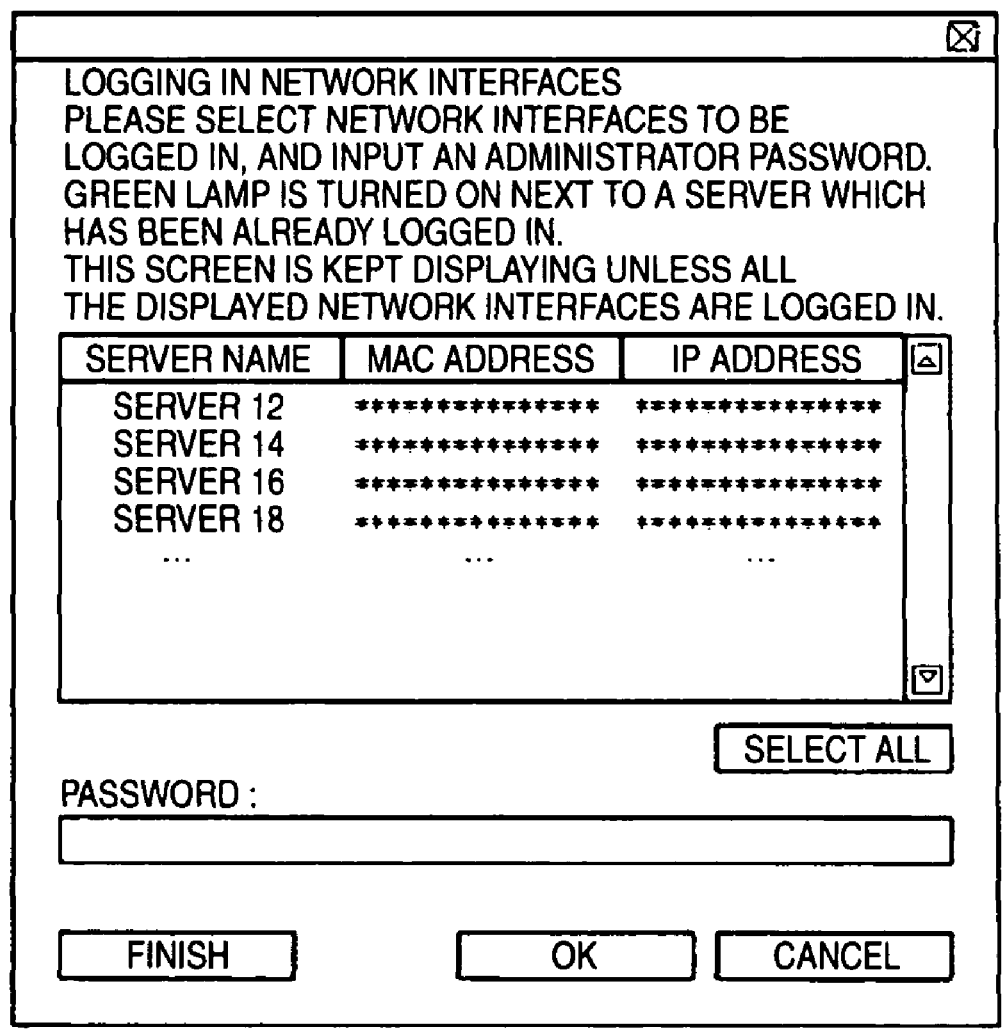

Next, login processing is described below that is performed by the client computer 20 when the login program 30 of the embodiment is executed with reference to FIG. 2. When the login processing is executed, first, all the servers 12-18 connected to the network 10 are searched and displayed on a login screen (step S100) as shown in FIG. 3. Then, reception processing is performed for the selection of servers and the input of a password provided from an operator (step S110). In this embodiment, a list of the server names, the MAC addresses, and the IP addresses of all the servers connected to the network 10 is displayed under the explanatory note of the login screen (in the center of the login screen). Under the list, displayed are an input field for password, a "select all" button, an "finish" button, an "OK" button, a "cancel" button, etc. Using a pointing device such as a mouse, an operator reverses (the display of) one or a plurality of desired servers and thereby selects servers to be logged into. Then, using a keyboard, the operator inputs a password into the input field for password. FIG. 4 shows this state. Here, the operator can cancel the selection of a server or servers having already been selected, when the reversed display is canceled using the pointing device. Further, as for the selection of servers, when the "select all" button is operated using the pointing device, etc., all the servers can be selected.

Then, in the state that the servers have been selected while the password has been inputted, when the "OK" button or the "finish" button is operated, the button having been operated is determined (step S120). When the "OK" button has been operated, login processing is executed for the next server in the sequence (the first server initially) among the selected servers by using the inputted password (step S130). Then, it is determined whether login has been successful (step S140). Whether the login has been successful is determined on the basis of a response from the server to which login processing is executed. Then, when the login is successful, a green lamp indicating successful login is turned on in the left side of the name of the successfully-logged-in server in the login screen (step S150), while the reversed display in the login screen is changed into normal display. Here, when login is unsuccessful, the green lamp is not turned on, while the reversed display is not changed into normal display.

Then, it is determined whether any next server is present in the sequence, that is, whether any server to which login processing is not yet performed is present among the selected servers (step S160). When the next server is present, the procedure returns to the login processing of step S130 for the next server. When no next server is present, it is determined whether login has been successful to all the servers connected to the network 10 (step S170). When any server to which login has been unsuccessful is present, the procedure returns to the reception processing for the selection of servers and the input of a password at step S110. When login has been successful to all the servers connected to the network 10, termination processing is executed such as the canceling of the display of the login screen (step S180), so that the login processing is terminated.

Supposing a case where the login password is common to the server 12 and the server 16 while the login password to the server 14 and the server 18 differs from the login password to the server 12 and the server 16, that is, for example, when the login password to the server 12 and the server 16 is "AAA" while the login password to the server 14 and the server 18 is "BBB," a case is considered below that the servers 12-18 are selected while "AAA" is inputted to the input field for password and that the "OK" button is then operated, login becomes successful for the server 12 and the server 16, so that a green lamp is turned on in the left side of each of the server names of the server 12 and the server 16 in the login screen while the reversed display for the server 12 and the server 16 is changed into normal display. On the other hand, since the login password for the server 14 and the server 18 is not "AAA," login becomes unsuccessful. Thus, a green lamp is not turned on in the left side of each of the server names of the server 14 and the server 18 in the login screen, while the reversed display for the server 14 and the server 18 is maintained intact in that state. FIG. 5 shows this state.

Here, the server 14 and the server 18 to which login using the password "AAA" has been unsuccessful are selected, while no input is yet provided to the input field for password. Thus, when the operator inputs "BBB" into the input field for password in this state and then operates the "OK" button, the processing of steps S130-S160 is repeatedly performed in a state that the server 14 and the server 18 are selected. Thus, the login with respect to the server 14 and the server 18 becomes successful. Accordingly, a green lamp is turned on in the left side of each of the server names of the server 14 and the server 18 in the login screen, while the reversed display for the server 14 and the server 18 is changed into normal display. Here, in the state of FIG. 5, the operator may select an additional server, or alternatively may cancel the selection of an already selected server.

In any one of a state that no server is selected while no password is inputted in the login screen, a state that a server is selected but a password is not yet inputted, and a state that a server is selected while a password is inputted, when the "finish" button is operated, termination processing such as canceling of the display of the login screen is executed intact in that state (step S180), so that the login processing is terminated. For example, when the "finish" button is operated in the state of FIG. 5, the login processing is terminated in a state that login is achieved for the server 12 and the server 16 while login is not achieved for the other servers.

According to the login program 30 of the embodiment described above, when a plurality of desired servers are selected from a plurality of servers connected to the network 10 while a password is inputted and while and the "OK" button is then simply operated, login can automatically be executed (achieved) to servers having a login password in agreement with the inputted password, among the selected servers. Further, for each server to which login has been successful, a green lamp is turned on in the left side of the corresponding server in the login screen. This allows the operator to be notified of servers to which login has been successful and servers to which login has been unsuccessful. Further, as for the servers to which login has been unsuccessful among the selected servers, login processing can be executed in a state that the servers have been selected, that is, starting with the reception processing for the input of a password. This avoids the necessity of reselection of servers, and hence simplifies the operation of login to a plurality of servers. Further, when the "finish" button is operated, the login processing is terminated regardless of the processing state. Thus, the login processing may be terminated when login a desired server is confirmed. This permits easy and more reliable login the desired server.

In the login program 30 of the embodiment, for each server to which login has been successful, a green lamp has been turned on in the left side of the corresponding server in the login screen. However, any indication may be employed as long as the successful login can be notified.

In the login program 30 of the embodiment, as for the servers to which login has been unsuccessful among the selected servers, login processing has been executed in a state that the servers have been selected, that is, starting with the reception processing for the input of a password. However, also for the servers to which login has been unsuccessful among the selected servers, login processing may be executed starting with the reception processing for the selection of servers and the input of a password. Further, login processing need not start with the reception processing for the selection of servers and the input of a password as described above.

That is, after login processing is performed for all the selected servers, the login processing may be terminated regardless of whether the login has been successful.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A login system, adapted to be connected to a network for logging in a plurality of servers connected to the network, the login system comprising:

a reception processor, to cause a display to display a list of the servers and a text box, and operable to receive a designation of at least two of the servers on the list and a first input of one password input on the text box from a user, the reception processor operable to receive one operation in a state that the designated at least two of the servers are indicated on the list and the input one password is indicated on the text box; and a login processor, operable to automatically execute a login processing with respect to one of the designated servers for which the received password is valid when the reception processor receives the one operation, and operable to automatically repeat to execute the login processing with respect to other one of the designated servers for which the received password is valid when the login processing has not been executed with respect to the other one of the designated after the login processing of the one of the servers is successfully executed, the login processor operable to activate the reception processor to receive a second input of a password with respect to at least one of the designated servers that the login processing is not successfully executed in a state that the at least two of the servers are designated.

2. The login system as set forth in claim 1, wherein the login processor causes the display to display an indicator next to the at least one of the designated servers, thereby indicating that the login processing is successfully executed with respect to the at least one of the designated servers.

3. The login system as set forth in claim 1, wherein the login processor is operable to repeat the activation of the reception processor until a termination requirement is satisfied.

4. The login system as set forth in claim 3, wherein the termination requirement is that the login processing is successfully executed with respect to all the designated servers.

5. The login system as set forth in claim 3, wherein the termination requirement is that an instruction for terminating the login processing is issued from the user.

6. A method of logging in a plurality of servers connected to a network, comprising:

displaying a list of the servers and a text box;

receiving a designation of at least two of the servers on the list and a first input of one password on the text box from a user;

receiving one operation in a state that the designated at least two of the servers are indicated on the list and the input one password is indicated on the text box;

executing automatically a login processing with respect to one of the designated servers for which the received password is valid when receiving the one operation;

repeating automatically to execute the login processing with respect to other one of the designated servers for which the received password is valid when the login processing has not executed with respect to the other one of the designated after the login processing of the one of the servers is successfully executed; and receiving a second input of a password with respect to at least one of the designated servers that the login processing is not successfully executed in a state that the at least two of the servers are designated.

7. A computer-readable recording medium comprising a computer program operable to cause a computer to execute the method as set forth in claim 6.

* * * * *